Feb. 20, 1934.    H. ALFARO    1,947,962
AERONAUTIC TRAINING APPARATUS
Filed Oct. 30, 1930    3 Sheets-Sheet 1

INVENTOR
Heraclio Alfaro
BY
Evans & McCoy
ATTORNEYS

Feb. 20, 1934.   H. ALFARO   1,947,962
AERONAUTIC TRAINING APPARATUS
Filed Oct. 30, 1930   3 Sheets-Sheet 2

INVENTOR
Heraclio Alfaro
BY
Evans & McCoy
ATTORNEYS

Feb. 20, 1934.  H. ALFARO  1,947,962
AERONAUTIC TRAINING APPARATUS
Filed Oct. 30, 1930   3 Sheets-Sheet 3

INVENTOR
Heraclio Alfaro
BY
Evans & McCoy
ATTORNEYS

Patented Feb. 20, 1934

1,947,962

UNITED STATES PATENT OFFICE 1,947,962

AERONAUTIC TRAINING APPARATUS

Heraclio Alfaro, East Cleveland, Ohio

Application October 30, 1930. Serial No. 492,236

16 Claims. (Cl. 35—12)

The present invention relates to aeronautical training apparatus and has for its object to provide training apparatus in the form of an air craft provided with controls corresponding to those of an airplane responding to the controls in a manner similar to an airplane in flight, and further to provide means for anchoring the aircraft and restraining the same to limited movements.

The device of the present invention is adapted to be operated either by artificially produced air currents or may be operated by the wind when the apparatus is mounted out-doors.

Prior methods of aeronautical training have been expensive and to a certain extent dangerous, or at least they have appeared dangerous to a majority of the public. For these reasons, aeronautical training has not been available to, and has not appealed to the greater majority of the public.

The present invention provides a training apparatus by means of which students may receive their primary flight training on the ground with perfect safety and at a very low cost.

A further object is to provide a training apparatus the use of which will educate a student's natural reflexes to the responsiveness of the controls of an airplane and to the lag which exists between the operation of the controls and the actual response of the machine.

A further object is to provide means for controlling the responsiveness of the training craft to the controls, so that the sensitiveness of the craft to the controls can be gradually increased as the proficiency of the student increases.

The present invention provides a training apparatus in the form of an airplane which is anchored to the ground but which has vertical movements corresponding to ascending and descending movements of an airplane in flight, and tilting and turning movements similar to the corresponding movements of an airplane in flight.

An additional object of the invention is to provide means by which the air currents acting upon the lifting surfaces may be varied to simulate conditions met with in actual flight, in order to teach the student how to manipulate the controls to meet various emergencies which may arise in flying.

With the above and other objects in view, the invention may be said to comprise the apparatus as illustrated in the accompanying drawings hereinafter described and particularly set forth in the appended claims, together with such variations and modifications thereof as will be apparent to one skilled in the art to which the invention appertains.

Reference should be had to the accompanying drawings, forming a part of this specification, in which.

Figure 1:
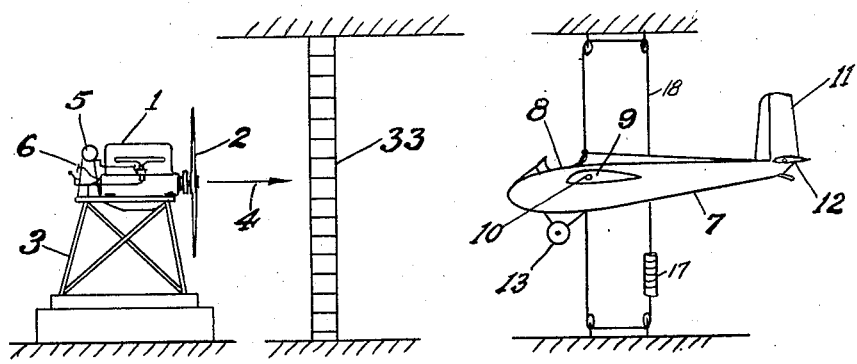
Figure 1 is a side elevation of training apparatus embodying the invention.

While the training apparatus of the present invention may be operated by wind currents in the open air, it is preferably mounted within a suitable building in a tunnel or passageway through which a strong current of air may be forced. As illustrated in Fig. 1 of the drawings, the air current may be produced by a suitable blower operated by an engine 1 which drives a suitable propeller 2, the engine and propeller being mounted on a suitable supporting frame 3 and the propeller being so positioned that when operated by the engine, it produces a rapidly moving current of air flowing in the direction indicated by the arrow 4. A suitable fuel supply tank 5 may be provided for the engine 1 and the operation of the engine may be controlled from a suitable control panel 6 provided with the usual instruments and controlling devices.

An aircraft provided with lifting and control surfaces corresponding to the lifting and control surfaces of an airplane is mounted in the path of the air current produced by the propeller 2 and the aircraft includes a fuselage 7, a cockpit 8, wings 9 which may be mounted to pivot about a horizontal axis 10, a vertical rudder 11, elevators 12, and a landing gear 13. The wings, rudder and elevators correspond to similar parts of an airplane and the movement of these parts is under the control of the student in the cockpit 8, operating levers being provided corresponding to those of an airplane. The wings 9 of the aircraft are smaller than the wings of an airplane, so that the lift is considerably less than that of an airplane.

The aircraft is mounted for limited vertical movement and for limited angular movements, being anchored to the ground and so counter-balanced that a relatively small lifting force is required to elevate the craft with the student in the cockpit.

Figure 2:
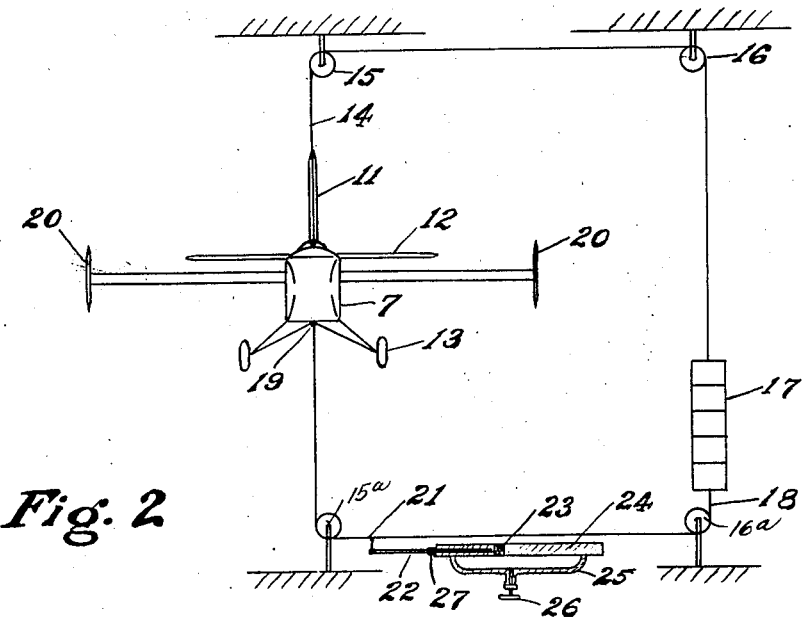
Fig. 2 is a front elevation of the counter-balanced airplane.

As shown in Figs. 1 and 2 of the drawings, the anchoring and counter-balancing means comprise a cable 14, which is attached at one end to the top of the fuselage, the cable 14 extending over pulleys 15 and 16 attached to the ceiling, and having a counter-weight 17 attached to its opposite end. A cable 18 is attached at one end to the under side of the counter-weight, passes under pulleys 15a and 16a attached to the floor and is connected at its opposite end to the under side of the fuselage 7. The counter-weight 17 will be regulated so that it will nearly counter-balance the weight of the aircraft with the student in the cockpit. With the craft so counter-balanced, the student in the cockpit, by manipulating the controls, may so dispose the lifting surfaces with respect to the air current as to cause the craft to ascend or descend in the same way that the pilot causes an airplane to ascend or descend.

In Fig. 2 of the drawings, vertical blades 20 are shown at the tips of the wings which extend at right angles to the wings and which impede laterally deflected air currents at the wing tips and increase the lift of the wings. The use of the blades 20 is, however, optional, since these blades are not essential to the operation of the device.

In order to prevent sudden movements and violent impacts which might be occasioned by unskillful manipulation of the controls, means is provided for automatically checking and retarding the movements of the aircraft in response to the controls, and this retarding means is made adjustable so that the retarding effect can be gradually decreased as the student acquires skill in the manipulation of the controls until finally the craft may be operated by the student with the retarding device entirely inoperative.

As shown in Fig. 2, the retarding device is in the form of a hydraulic shock absorber which is attached at 21 to the cable 18. The shock absorber comprises a rod 22 attached to the cable, a piston 23, to which the rod is fixed, which operates in a cylinder 24 filled with oil or other suitable liquid. The cylinder is provided with a by-pass 25 connecting opposite ends thereof and the by-pass tube is provided with an adjustable valve 26 by means of which the passage through the tube 25 may be partially or wholly closed. Adjustment of the valve 26 regulates the rate of flow of liquid through the by-pass 25 and controls the speed of movement of the piston 23, when the piston is moved by the cable 18.

It will be apparent that by adjusting the valve 26, the movements of the aircraft may be slowed up as much as desired. At the beginning of a course of instruction, the retarding device will be adjusted so that the movement of the craft in response to the operation of the controls is relatively slow and the retarding effect will be gradually diminished as proficiency of the student increases, until the student is able to manipulate the controls satisfactorily without the retarding device.

Cables 14 and 18 provide a flexible support for the aircraft which will permit a certain amount of angular movement about vertical and horizontal axes. By operating the rudder 11, a certain amount of rotation about a vertical axis may be obtained, corresponding to the movement of an airplane under the control of its rudder. For lateral control, the wings 9 may be moved about their pivotal axis 10 in such manner that the angle of one of the wings is increased while the angle of the other is decreased. If preferred, the wings 9 may be fixed to the fuselage and provided with a conventional type of ailerons for lateral control.

Figure 3:
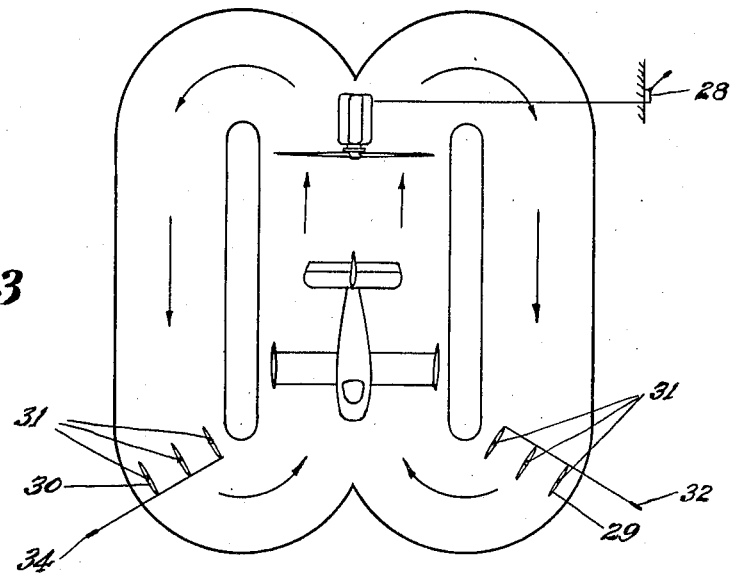
Fig. 3 is a plan view showing a modified form of wind tunnel.

The training aircraft of the present invention may be operated by placing it in front of a suitable blower, as shown in Fig. 2, but it is preferred to have the air drawn by the propeller past the aircraft, as shown in Fig. 3, a closed circuit being provided for the air current as in the usual types of wind tunnel.

A remote control 28 is preferably provided for the engine throttle and this control may be placed either within convenient reach of the instructor or, if preferred, it may be placed in the cockpit of the aircraft by means of a suitable flexible connection, so that the student may control the velocity of the air current.

The ignition switch of the blower engine may also be placed within reach of the instructor, so that by stopping the engine, he may force the student to come to a landing before the moving stream of air stops, or, the ignition switch may be placed in the cockpit of the aircraft so that the student may stop the engine whenever he desires to make a landing under these conditions.

Means is preferably provided for controlling the air current flowing over the lifting and control surfaces of the aircraft and this controlling means may be in the form of suitable vanes 29 and 30 which may be mounted to swing about pivotal axes 31. The vanes on each side may be provided with operating rods 32 and 34 which are pivotally connected to each of the vanes and which may be pushed or pulled to simultaneously swing the vanes to positions offering varying resistance to the passage of the air stream. By means of the vanes 29 and 30, the velocity of the air stream passing over either of the wings 9 may be varied, so that a condition simulating air pockets or other disturbances in the air stream may be created. For instance, by partially shutting one set of vanes, the speed of air flow on one side will be reduced and a smaller lift will result on the wing corresponding to that side, producing a rotation about the horizontal axis. The student, in that case, must operate his lateral control accordingly to correct the disturbance.

In the modification shown in Fig. 1, similar results may be obtained by a series of horizontally disposed vanes 33, which may be adjusted about horizontal axes to create disturbances in the air streams similar to those created by the vanes shown in Fig. 3.

The aircraft may be provided with an air-speed indicator and altimeter, such as employed in the conventional airplane, so as to give the student training in the use of these instruments.

Figure 4:
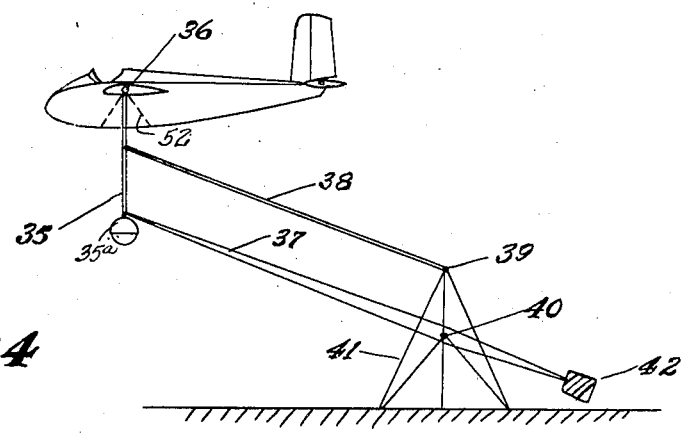
Fig. 4 is a side elevation showing a modified plane anchoring and counterbalancing means.

A modified form of the counter-balancing support for the aircraft is shown in Fig. 4 of the drawings in which a beam-type of support is employed instead of pulleys and cables. In this modification, a vertical member 35 is pivoted at 36 to the aircraft by a ball and socket connection, so as to permit a certain amount of angular movement about any axis. The vertical member 35 is attached to the forward end of a beam 37 and to the forward end of a rod 38 which is parallel with the beam 37, the beam 37 being mounted on parallel horizontal pivots 39 and 40 on a suitable support 41. The rod 38 and beam 37 provide a parallel link arrangement which maintains the member 35 in vertical position. The beam 37 extends rearwardly, past the pivot 40, and has a counter weight 42 adjustably mounted thereon, so that the desired balance may be obtained. If desired the lower end of the rod 35 below the beam 37 may be provided with a buffer 35a for engagement with the ground. The aircraft itself may be of the same construction as that illustrated in Figs. 1 and 2 and the operation is obviously very much like that described in connection with cable supporting device.

Figure 5:
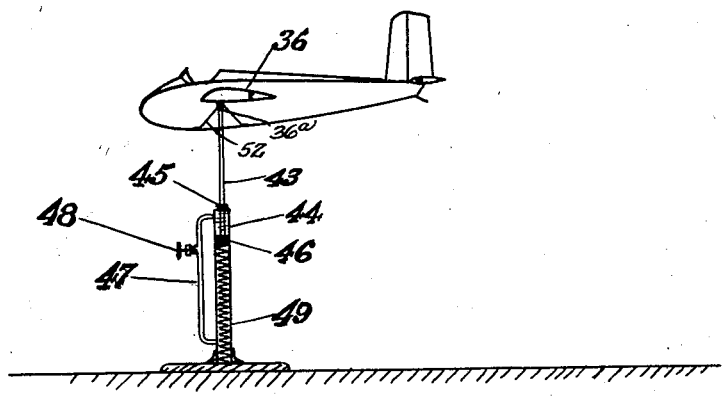
Fig. 5 is a side elevation showing a further modification of the invention.
Figure 6:
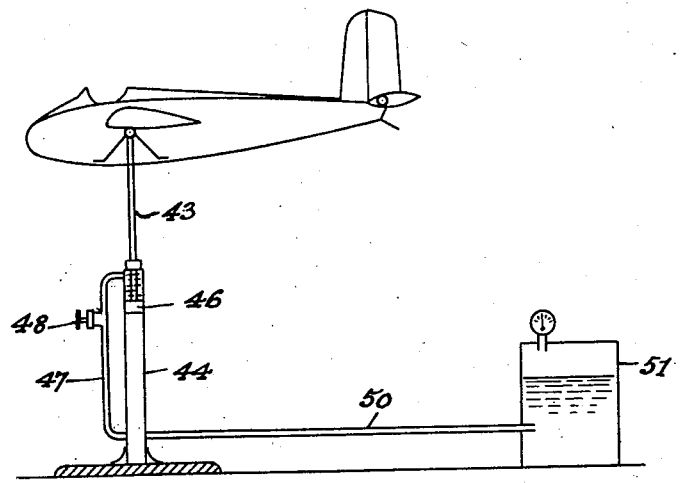
Fig. 6 is a side elevation showing the device of Fig. 5 provided with a different form of counterbalancing means.

In Figs. 5 and 6 of the drawings, additional forms of supporting device are illustrated. In these modifications, the air craft is pivotally supported by means of a ball and socket joint 36a upon the upper end of a vertical rod 43 which is mounted for endwise movements and which is connected to a suitable fluid pressure retarding device. As shown herein the rod 43 extends into a cylinder 44 carried by a fixed support and contains oil or other suitable liquid. The upper end of the cylinder is provided with a suitable packing 45 around the rod 43 and the rod 43 is attached to a piston 46 within the cylinder. The rate of displacement of liquid in the cylinder 44 by the piston 46 as the aircraft is moved upwardly or downwardly is controlled in such a manner as to restrict the velocity of movement of the aircraft. If it is desired to adjust the retarding effect, a solid piston may be employed and a by-pass 47 be provided between the upper and lower ends of the cylinder, the by-pass being controlled by means of an adjustable valve 48 which regulates the rate of flow of the liquid. In this case, the retarding effect is controlled in substantially the same manner as in the modification shown in Fig. 1 and Fig. 2.

A counter-balancing effect can be obtained by providing a coil spring 49 beneath the piston 46, as shown in Fig. 5, or by means of a fluid pressure counter-balance such as shown in Fig. 6 in which a pipe 50 is connected to the lower end of the cylinder 44 and to an auxiliary tank 51, which is partially filled with liquid and in which the air above the level of the liquid is retained at a desired pressure by suitable pumping apparatus.

In the modifications shown in Figs. 4 and 5, the vertical rod is attached to the aircraft by a ball and socket joint 36, which is disposed at the upper end of a conical socket 52. The ball and socket joint permits angular movement about any axis, while the wall of the conical socket limits the extent of angular movement.

It will be apparent that the present invention provides a very convenient, effective and inexpensive apparatus for preliminary aeronautic training by means of which a student may be thoroughly taught how to control an airplane under conditions simulating actual flight, so that only a short period of training in actual flying will be required.

Furthermore, it is to be understood that the particular forms of apparatus shown and described, and the particular procedure set forth, are presented for purposes of explanation and illustration and that various modifications of said apparatus and procedure can be made without departing from my invention as defined in the appended claims.

What I claim is:

1. Aeronautical training apparatus comprising an airplane having wings, movable controlling surfaces and controlling means under the control of an operator in the cockpit, means for anchoring and counter-balancing said airplane, said airplane being connected to the anchoring and counter-balancing means for movements bodily up and down and for angular movements, and means for controlling the responsiveness of the airplane to movements of said control elements.

2. Aeronautical training apparatus comprising an airplane having wings, movable controlling surfaces and controlling means under the control of an operator in the cockpit, means for anchoring and counter-balancing said airplane, said airplane being connected to the anchoring and counter-balancing means for movements bodily up and down and for angular movements, a shock absorber connected to the airplane through the anchoring means for retarding movements of the airplane in any position thereof, and means for regulating the retarding action of said shock absorber.

3. Aeronautical training apparatus comprising an airplane having wings, movable controlling surfaces and controlling means under the control of an operator in the cockpit, means for anchoring and counterbalancing said airplane, said airplane being connected to the anchoring and counter-balancing means for movements bodily up and down and for angular movements, means for creating a current of air and for directing the same horizontally toward the front of said airplane and against the lifting and control surfaces thereof, and means for controlling said air currents.

4. Aeronautical training apparatus comprising an airplane having wings, movable controlling surfaces and controlling means under the control of an operator in the cockpit, means for anchoring and counter-balancing said airplane, said airplane being connected to the anchoring and counter-balancing means for movements bodily up and down and for angular movements, means for creating a current of air and for directing the same horizontally toward the front of said airplane and against the lifting and control surfaces thereof, and means for independently controlling the flow of air past the opposite wings of the airplane.

5. Aeronautical training apparatus comprising an airplane having wings, movable controlling surfaces and controlling means under the control of an operator in the cockpit, means for anchoring and counter-balancing said airplane, said airplane being connected to the anchoring and counterbalancing means for movements bodily up and down and for angular movements, and means including a source of power independent of the airplane for subjecting the lifting and control surfaces of said airplane to a current of air.

6. Aeronautical training apparatus comprising an airplane having wings, movable controlling surfaces and controlling means under the control of an operator in the cockpit, means for anchoring and counter-balancing said airplane, said airplane being connected to the anchoring and counter-balancing means for movements bodily up and down and for angular movements, a fluid pressure shock-absorber associated with the anchoring means for retarding movement of the airplanes, and an adjustable valve for regulating the retarding action of said shock absorber.

7. Aeronautical training apparatus comprising an airplane having wings, movable controlling surfaces and controlling means under the control of an operator in the cockpit, means for anchoring and counter-balancing said airplane, said airplane being connected to the anchoring and counter-balancing means for movements bodily up and down and for angular movements, a blower for creating a current of air and for directing the same horizontally toward the front of said airplane and against the lifting and control surfaces thereof, and means under the control of an operator on the ground for controlling said blower.

8. Aeronautical training apparatus comprising an airplane having wings, movable controlling surfaces and controlling means under the control of an operator in the cockpit, means for anchoring and counter-balancing said airplane, said airplane being connected to the anchoring and counter-balancing means for movements bodily up and down and for angular movements, a blower for creating a current of air and for directing the same toward the front of said airplane and against the lifting and control surfaces thereof, and means operable by an operator in the cockpit of the airplane for controlling said blower.

9. Aeronautical training apparatus comprising a wind tunnel, an airplane mounted in said tunnel, said airplane having wings, movable controlling surfaces and controlling means under the control of an operator in the cockpit thereof, means for anchoring and counter-balancing said airplane, said airplane being connected to the anchoring and counter-balancing means for movements bodily up and down and for angular movements, means for creating a current of air through said wind tunnel, and vanes in said tunnel for controlling said air current.

10. Aeronautical training apparatus comprising a wind tunnel having an air return to provide an endless air circuit, means for circulating the current of air through said tunnel, an airplane having wings, movable controlling surfaces and controlling means under the control of an operator in the cockpit thereof, means for anchoring and counter-balancing said airplane, said airplane being connected to the anchoring and counter-balancing means for movements bodily up and down and for angular movements.

11. Aeronautical training apparatus comprising a wind tunnel having an air return to provide an endless air circuit, means for circulating the current of air through said tunnel, an airplane having wings, movable controlling surfaces and controlling means under the control of an operator in the cockpit thereof, means for anchoring and counterbalancing said airplane, said airplane being connected to the anchoring and counterbalancing means for movements bodily up and down and for angular movements, and vanes in said tunnel for controlling said air current.

12. In an arrangement of the character described, an aircraft comprising a body having wings, a seat, controls at said seat, an elevator and a rudder, a base support adapted to rest on a supporting surface, a universal connection between said body and support near the center of gravity of the aircraft and a source of wind external to said aircraft blowing from front to rear whereby a person operating said aircraft may receive sensations of actual flight.

13. In aeronautical apparatus, a supporting pedestal, an aircraft universally mounted on said pedestal, and separate means for directing a current of air against said aircraft, whereby said aircraft may be manipulated while mounted on said pedestal by an operator in said aircraft.

14. Aeronautical training apparatus comprising an airplane having wings and controlling means under the control of an operator in the cockpit, and means for anchoring and counter-balancing said airplane.

15. Aeronautical training apparatus comprising an airplane having wings and controlling means under the control of an operator in the cockpit, means for anchoring and counterbalancing said airplane and means for subjecting the lifting and control surfaces of said airplane to a current of air.

16. Aeronautical training apparatus comprising an airplane having wings and controlling means under the control of an operator in the cockpit, means for anchoring and counterbalancing said airplane, and means for creating a current of air and for directing the same horizontally towards the front of said airplane and against the lifting and control surfaces thereof.

HERACLIO ALFARO.